United States Patent
Matsumoto

(10) Patent No.: US 7,587,654 B2
(45) Date of Patent: Sep. 8, 2009

(54) QUANTUM KEY DISTRIBUTION METHOD AND COMMUNICATION APPARATUS

(75) Inventor: Wataru Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 402 days.

(21) Appl. No.: 10/588,787

(22) PCT Filed: Feb. 10, 2004

(86) PCT No.: PCT/JP2004/001389

§ 371 (c)(1),
(2), (4) Date: Aug. 9, 2006

(87) PCT Pub. No.: WO2005/076520

PCT Pub. Date: Aug. 18, 2005

(65) Prior Publication Data

US 2008/0222487 A1    Sep. 11, 2008

(51) Int. Cl.
*H03M 13/00* (2006.01)
(52) U.S. Cl. .................. 714/758; 714/780; 713/150
(58) Field of Classification Search ............ 714/758, 714/780, 755, 752, 763, 801, 800, 753, 757, 714/761; 713/150, 189
See application file for complete search history.

(56) References Cited

U.S. PATENT DOCUMENTS 5,768,378 A * 6/1998 Townsend et al. .......... 380/256

6,801,626 B1 * 10/2004 Nambu ...................... 380/256
2002/0168033 A1   11/2002 Suzuki et al.

FOREIGN PATENT DOCUMENTS

| KR | 1020040087066 A | 10/2004 |
| KR | 1020060003329 A | 1/2006 |
| KR | 1020060059853 A | 6/2006 |

OTHER PUBLICATIONS

Quantum Cryptography: Public Key Distribution and Coin Tossing, Charles H. Bennett, Gilles Brassard, International Conference on Computers, Systems & Signal Processing, Bangalore, India, Dec. 10-12, 1984.

Charles H. Bennett et al., Proceedings of IEEE Conference on Computers, Systems and Signals Processing, Bangalore, India, Dec. 10-12, 1984, pp. 175-179.

(Continued)

*Primary Examiner*—Esaw T Abraham
*Assistant Examiner*—Fritz Alphonse
(74) *Attorney, Agent, or Firm*—Birch, Stewart, Kolasch & Birch, LLP

(57) ABSTRACT

An error of reception data is corrected using check matrixes for an "Irregular-LDPC code" that are definite and have stable characteristics and a part of shared information is discarded according to error correction information opened to the public. A parity check matrix corresponding to a specific coding rate is extracted from parity check matrix optimized at a coding rate in a desired range while a coding rate is lowered until the error of the reception data is completely corrected, an additional syndrome is generated, and error correction processing is repeatedly executed using the additional syndrome.

9 Claims, 13 Drawing Sheets

OTHER PUBLICATIONS

Gilles Brassard et al., Advances in Cryptology-Eurocrypt' 93, Lecture Notes in Computer Science 765, pp. 410-423.

Matsumoto W. et al., IEICE Trans. Fundamentals, Jul. 2003, vol. E86-A, No. 7, pp. 1820 to 1834.

Matsumoto W. et al., The 26th Symposium on Information Theory and its Applications (SITA2003), Dec. 15-18, 2003, pp. 273 to 276.

Yuichi Ishizuka et al., 2004 Nen Ango to Joho Security Symposium Yokoshu, vol. I, Jan. 27, 2004, pp. 253 to 258.

Watanabe et al., The 2003 Symposium on Cryptography and Information Security Hamamatsu, Japan, The Institute of Electronics, Information and Communication Engineers, Jan. 26-29, 2003.

Brassard, Gilles and Louis Salvail, "Secret-Key Reconciliation by Public Discussion", 1998, pp. 410-423, Springer-Verlag.

Butler, W. T. et al., "Fast, efficient error reconciliation for quantum cryptology", Physical Review A 67 (Atomic, Molecular, and Optical Physics), The American Physical Society, vol. 67, No. 5, May 15, 2003, pp. 52303-1-052303-8, XP007908126.

* cited by examiner

FIG.1
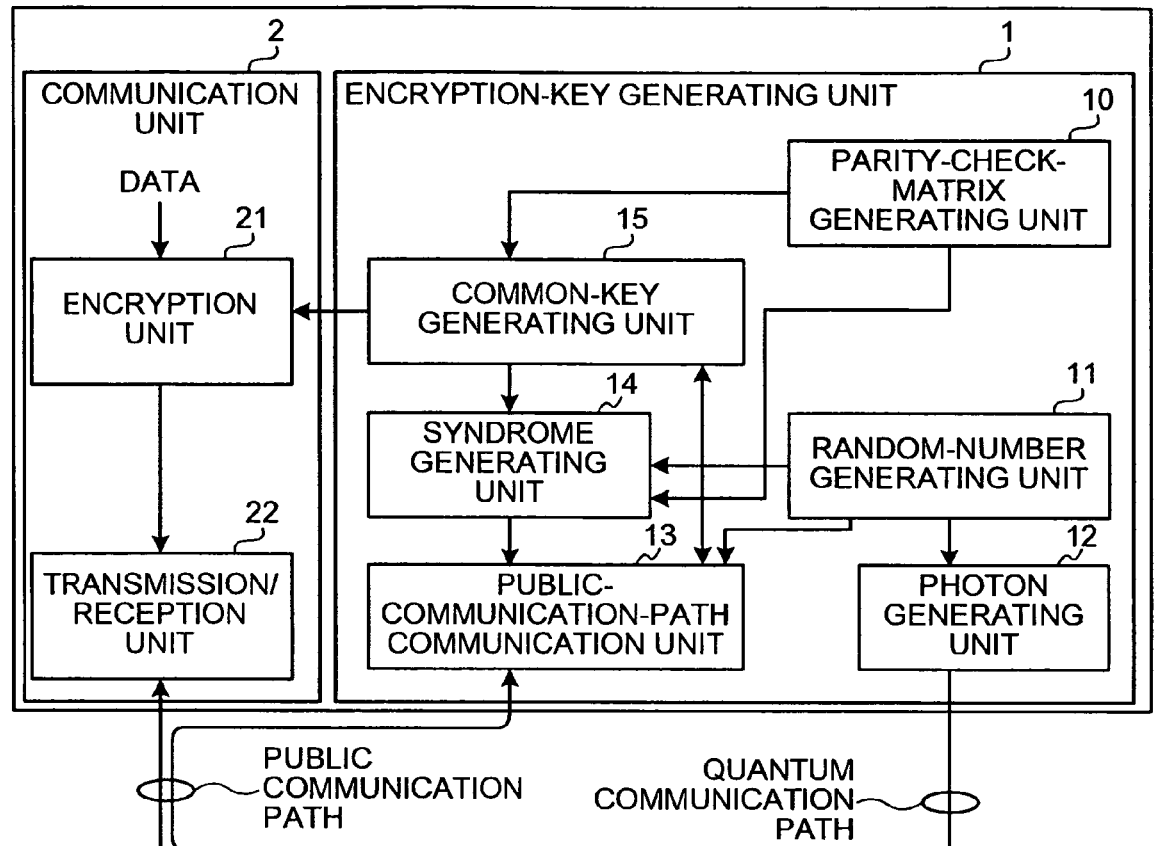
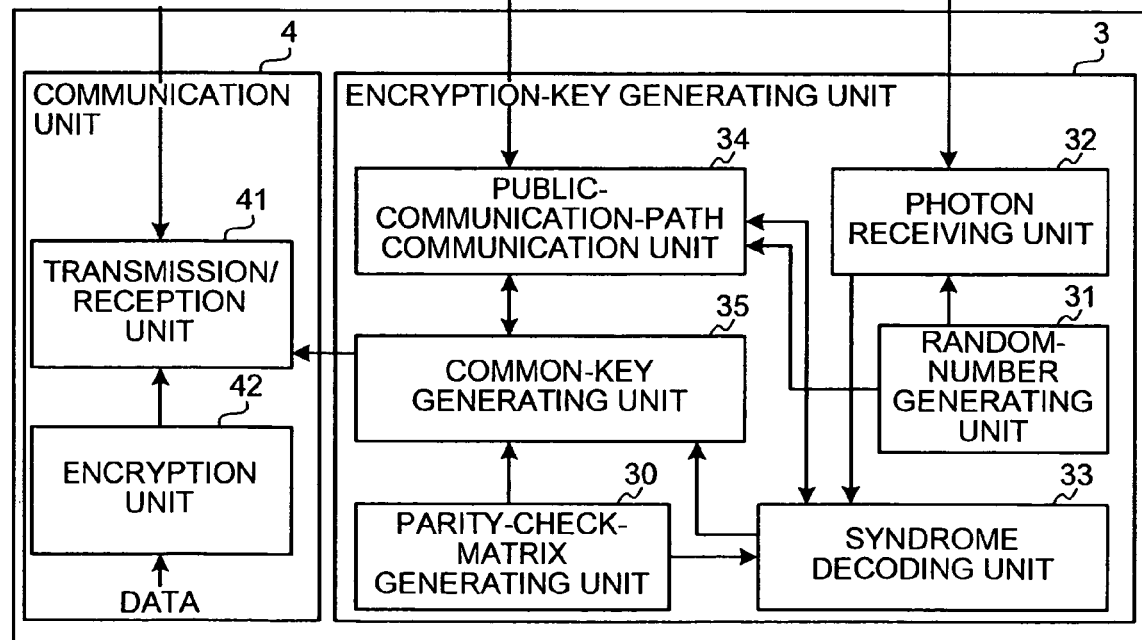

FIG.8

| RATE | RATE=0.6 |
|---|---|
| ORDER i | COLUMN ORDER RATIO $\lambda_i(R(l))$ |
| 1 | |
| 2 | 0.01 |
| 3 | 0.970022733 |
| 4 | 0.019977267 |
| ORDER i | ROW ORDER RATIO $\rho_i(R(l))$ |
| 2 | |
| 7 | 7/15 |
| 8 | 8/15 |

FIG.9

| | $H_{R(l)}=0.6$ | |
|---|---|---|
| ORDER i | COLUMN ORDER RATIO $\lambda_i(R(l))$ | NUMBER OF COLUMNS $n_v(x,R(l))(m'=1000)$ |
| 1 | 0.0372 | 279 |
| 2 | 0.8884 | 4442 |
| 3 | 0.0744 | 279 |
| 4 | | |
| ORDER i | ROW ORDER RATIO $\rho_i(R(l))$ | NUMBER OF ROWS $n_c(x,R(l))(m'=1000)$ |
| 2 | | |
| 3 | | |
| 7 | 7/15 | 1000 |
| 8 | 8/15 | 1000 |

FIG.11

| ORDER i | $H_{R(l)=0.6}$ | | | $H_{R(l-1)=0.4}$ | | | $A_{R(l-1)=0.4}$ |
|---|---|---|---|---|---|---|---|
| | COLUMN ORDER RATIO $\lambda_i(R(l))$ | NUMBER OF COLUMNS $n_v(x,R(l))$ (m'=1000) | | COLUMN ORDER RATIO $\lambda_i(R(l-1))$ | NUMBER OF COLUMNS $n_v(x,R(l-1))$ (m'=1000) | | NUMBER OF COLUMNS |
| 1 | | | | | | | 150<br>COLUMN IDENTICAL WITH $\lambda_3(R(l))$: 150 |
| 2 | 0.0372 | 279 | | 0.0310 | 279 | | 6<br>COLUMN IDENTICAL WITH $\lambda_3(R(l))$: 6 |
| 3 | 0.8884 | 4442 | | 0.6133 | 3619 | | 946<br>COLUMN IDENTICAL WITH $\lambda_4(R(l))$: 279<br>COLUMN IDENTICAL WITH $\lambda_3(R(l))$: 667 |
| 4 | 0.0744 | 279 | | 0.0333 | 150 | | |
| 5 | | | | 0.0017 | 6 | | |
| 6 | | | | 0.2833 | 667 | | |
| 7 | | | | 0.0373 | 279 | | |

| ORDER i | ROW ORDER RATIO $\rho_i(R(l))$ | NUMBER OF ROWS $n_c(x,R(l))$ (m'=1000) | | ROW ORDER RATIO $\rho_i(R(l-1))$ | NUMBER OF ROWS $n_c(x,R(l-1))$ (m'=1000) | | |
| 2 | | | | 3/18 | 1000 | | |
| 3 | | | | 7/18 | 1000 | | |
| 7 | 7/15 | 1000 | | | | | |
| 8 | 8/15 | 1000 | | 8/18 | 1000 | | |

PRIOR ART

QUANTUM KEY DISTRIBUTION METHOD AND COMMUNICATION APPARATUS

TECHNICAL FIELD

The present invention relates to a quantum key distribution method capable of generating a common key, security of which is highly guaranteed, and more particularly, to a quantum key distribution method capable of correcting a data error using an error correction code and a communication apparatus capable of realizing the quantum key distribution.

BACKGROUND ART

The conventional quantum cryptograph system is explained below. In recent years, optical communication is widely used as a high-speed large-capacity communication technology. In such an optical communication system, communication is performed according to ON/OFF of light and a large quantity of photons are transmitted when light is ON. Thus, the optical communication system is not a communication system in which a quantum effect is developed directly.

On the other hand, in the quantum cryptograph system, photons are used as communication media to transmit information of one bit using one photon such that a quantum effect such as uncertainty principle is developed. In this case, when a wiretapper selects a base at random and measures photons without knowing a quantum state such as polarization and a phase of the photons, the quantum state changes. Therefore, on the reception side, it is possible to recognize, by confirming the change in the quantum state of the photons, whether transmitted data has been wiretapped.

FIG. 19 is a schematic of the conventional quantum key distribution using polarized light. For example, a measuring device, which is capable of identifying polarized light in horizontal and vertical directions, identifies light polarized in the horizontal direction (0°) and light polarized in the vertical direction (90°) on a quantum communication path correctly. On the other hand, a measuring device, which is capable of identifying polarized light in oblique directions (45° and 135°), identifies light polarized in the 45° direction and 135° direction on a quantum communication path correctly.

In this way, the respective measuring devices can recognize light polarized in the defined directions correctly. However, for example, when the measuring device, which is capable of identifying polarized light in the horizontal and vertical directions (0° and 90°), measures light polarized in an oblique direction, the measuring device identifies light polarized in the horizontal direction and light polarized in the vertical direction at random at a probability of 50 percent, respectively. In other words, when the measuring device that does not cope with identifiable polarization directions is used, it is impossible to identify a direction in which light is polarized even if a result of measurement by the measuring device is analyzed.

In the conventional quantum key distribution shown in FIG. 19, a sender and a receiver share a key while keeping the key secret from wiretappers (see, for example, Nonpatent Literature 1). Note that the sender and the receiver can use a public communication path other than the quantum communication path.

A procedure for sharing a key is explained. First, the sender generates a random number sequence (a sequence of 1 and 0: transmission data) and determines transmission codes (+: a code corresponding to the measuring device capable of identifying light polarized in the horizontal and vertical directions, ×: a code corresponding to the measuring device capable of identifying light polarized in the oblique directions) at random. A polarization direction of light to be transmitted is automatically determined according to combinations of the random number sequence and the transmission codes. Light polarized in the horizontal direction according to a combination of 0 and +, light polarized in the vertical direction according to a combination of 1 and +, light polarized in the 45° direction according to a combination of 0 and ×, and light polarized in the 135° direction according to a combination of 1 and × are transmitted to the quantum communication path, respectively (transmission signals).

The receiver determines reception codes (+: a code corresponding to the measuring device capable of identifying light polarized in the horizontal and vertical directions, ×: a code corresponding to the measuring device capable of identifying light polarized in the oblique directions) at random and measures light on the quantum communication path (reception signals). The receiver obtains reception data according to combinations of the reception codes and the reception signals. The receiver obtains 0, 1, 0, and 1 as reception data according to a combination of the light polarized in the horizontal direction and +, a combination of the light polarized in the vertical direction and +, a combination of the light polarized in the 45° direction and ×, and a combination of the light polarized in the 135° direction and ×, respectively.

In order to check whether measurement for the receiver has been performed by a correct measuring device, the receiver sends the reception codes to the sender thorough the public communication path. The sender, who has received the reception codes, checks whether the measurement has been performed by a correct measuring device and returns a result of the check to the receiver through the public communication path.

The receiver keeps only the reception data corresponding to the reception signals received by the correct measuring device and disposes of other reception data. At this point, the reception data kept can be shared by the sender and the receiver surely.

The sender and the receiver send a predetermined number of data selected from the shared data to each other through the public communication path. Then, the sender and the receiver check whether the reception data coincide with the data held by the sender and the receiver themselves. For example, if at least one data among the data checked does not coincide with the data held by the sender and the receiver, the sender and the receiver judge that a wiretapper is present, dispose of the shared data, and repeat the procedure for sharing a key from the beginning. On the other hand, when all the data checked coincide with the data held by the sender and the receiver, the sender and the receiver judge that no wiretapper is present, dispose of the data used for the check, and use the remaining shared data as a shared key for the sender and the receiver.

On the other hand, as an application of the conventional quantum key distribution method, for example, there is a quantum key distribution method that is capable of correcting a data error on a transmission path (see, for example, Non-patent Literature 2).

In this method, to detect a data error, a sender divides transmission data into plural blocks and sends a parity for each block on a public communication path. Then, a receiver compares the parity for each block received through the public communication path and a parity of a corresponding block in reception data to check a data error. In this case, when there is a different parity, the receiver returns information indicating a block of the different parity on the public communication path. The sender further divides the pertinent block into a former half block and a latter half block and returns, for example, a former half parity on the public communication path (binary search). Thereafter, the sender and the receiver specify a position of an error bit by repeatedly executing the binary search. Finally, the receiver corrects the bit.

Moreover, assuming that a parity is judged as correct because of an even number of errors regardless of an error in data, the sender rearranges transmission data at random (random replacement) to divide the transmission data into plural blocks and performs the error correction processing with the binary search again. Then, the sender repeatedly executes this error correction processing with the random replacement to thereby correct all the data errors.

Nonpatent Literature 1

Bennett, C. H. and Brassard, G., "Quantum Cryptography", Public Key Distribution and Coin Tossing, In Proceedings of IEEE Conference on Computers, System and Signal Processing, Bangalore, India, pp. 175-179 (December 1984).

Nonpatent Literature 2

Brassard, G. and Salvail, L., "Secret-Key Reconciliation by Public Discussion", In Advances in Cryptology-EUROCRYPT' 93, Lecture Notes in Computer Science 765, pp. 410-423 (1993).

However, an error communication path is not assumed in the conventional quantum key distribution shown in FIG. 19. Therefore, when there is an error, the sender and the receiver dispose of the common data (the common key) judging that a wiretapping act is performed. This extremely deteriorates efficiency of generation of a common key depending on a transmission path.

In the quantum key distribution method capable of correcting a data error on the transmission path, parities are exchanged an extremely large number of times to specify an error bit and the error correction processing by the random replacement is performed for a predetermined number of times. Therefore, a great deal of time is consumed for the error correction processing.

The present invention has been devised in view of the circumstances and it is an object of the present invention to provide a quantum key distribution method that is capable of generating a common key, security of which is highly guaranteed, while correcting a data error on a transmission path using an error correcting code having an extremely high property.

DISCLOSURE OF INVENTION

A quantum key distributing method according to one aspect of the present invention is for correcting an error of reception data with probability information obtained as a result of measurement of photons on a quantum communication path to estimate original transmission data and using a result of the estimation as shared information. The quantum key distributing method includes a first check-matrix generating step at which communication apparatus on a transmission side and a reception side individually generate a first parity check matrix (identical in the respective devices) optimized at a coding ratio in a desired range and extract a second parity check matrix (identical in the respective devices) corresponding to a specific coding ratio in the range from the first parity check matrix; a first error-correction-information notifying step at which the communication apparatus on the transmission side notifies the communication apparatus on the reception side of first error correction information generated based on the second parity check matrix and the transmission data via a public communication path; a first error correction step at which the communication apparatus on the reception side corrects an error of the reception data based on the first error correction information; a second check-matrix generating step at which, when the error of the reception data is not completely corrected, the communication apparatuses on the reception side and the transmission side individually extract a third parity check matrix (identical in the respective devices) corresponding to a coding ratio lower than the last coding ratio from the first parity check matrix such that the last error correction information is a part of information at the time of next error correction; a second error-correction-information notifying step at which the communication apparatus on the transmission side notifies the communication apparatus on the reception side of additional second error correction information generated based on the third parity check matrix and the transmission data via the public communication path; a second error correction step at which the communication apparatus on the reception side corrects the error of the reception data based on the first and the second error correction information; and an encryption-key generating step of discarding a part of shared information according to an amount of error correction information laid open to the public and setting a result of discarding the part of the shared information as an encryption key when the error of the reception data is completely corrected in the processing at the first error correction step or when the error is completely corrected by repeatedly executing the processing at the second check-matrix generating step, the second error-correction-information notifying step, and the second error correction step.

According to the present invention, an error of reception data is corrected using check matrixes for the "Irregular-LDPC code", which are definite and have stable characteristics, and a part of shared information is discarded according to error correction information laid open to the public. Consequently, parities are not exchanged the enormous number of times to specify and correct an error bit. Error correction control is performed by simply transmitting error correction information. Thus, it is possible to substantially reduce time required for error correction processing. Since a part of shared information is discarded according to information laid open to the public, it is possible to generate a common key security of which is highly guaranteed.

Furthermore, according to the present invention, a parity check matrix corresponding to a specific coding ratio is extracted from parity check matrixes optimized by coding ratios in a predetermined range while the coding ratio is lowered until an error of reception data is completely corrected, an additional syndrome is generated, and error correction processing is repeatedly executed using the additional syndrome. Since this makes it unnecessary to discard shared information generated for estimating a noise level of a communication path, it is possible to substantially improve efficiency of generating a common key.

BRIEF DESCRIPTION OF DRAWINGS

FIG. 1 is a diagram of a constitution of a quantum cryptographic system according to the present invention;

FIG. 8 is a table of an order allocation after optimization calculation;

FIG. 9 is a table of an order allocation after adjustment;

FIG. 11 is a table of an order allocation obtained as a result of the optimization calculation;

BEST MODE(S) FOR CARRYING OUT THE INVENTION

Figure 2:
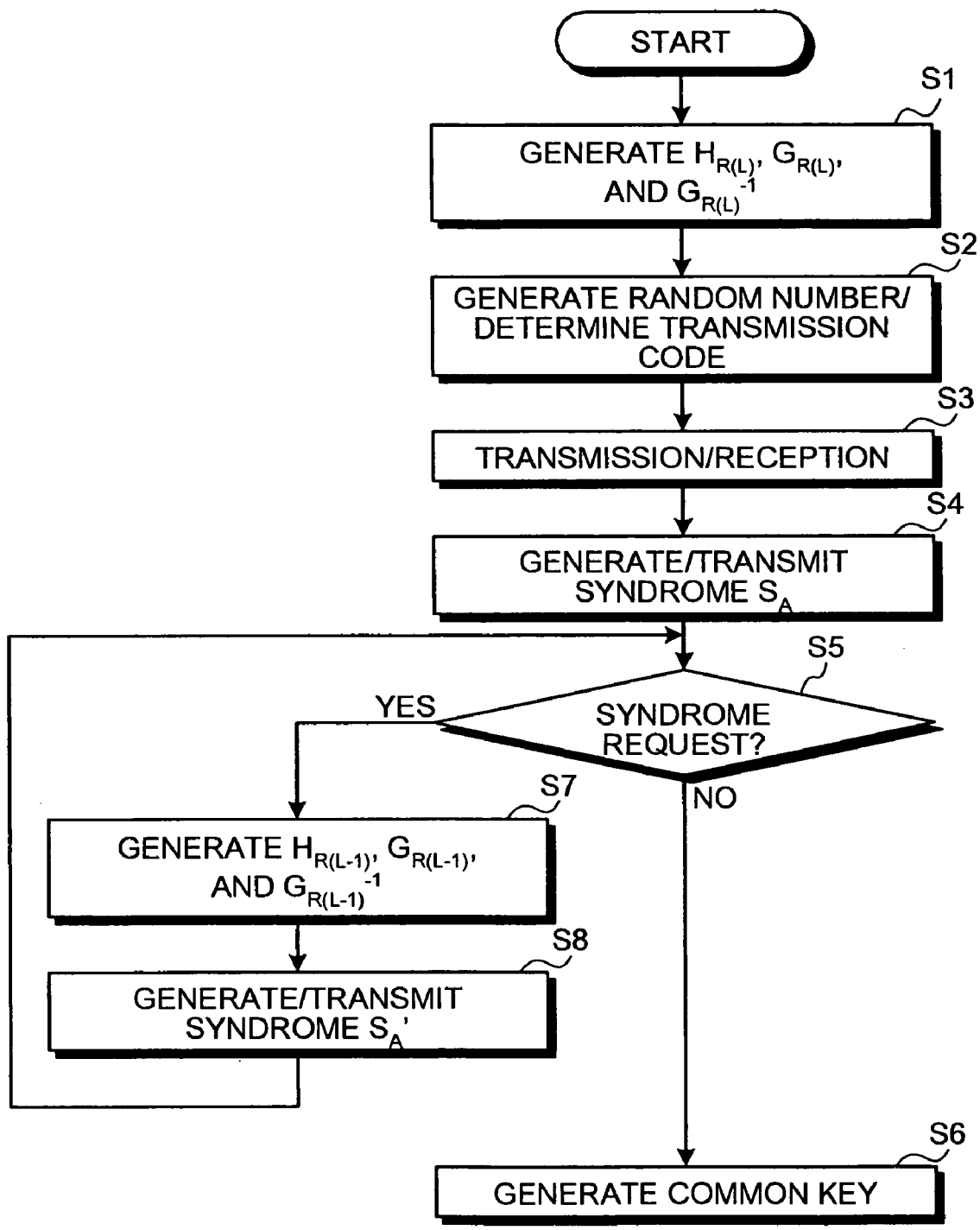
FIG. 2 is a flowchart of quantum key distribution according to a first embodiment of the present invention.

Exemplary embodiments of a quantum key distribution method according to the present invention are explained in detail below with reference to the accompanying drawings. Note that the present invention is not limited by the embodiments. Quantum key distribution using polarized light is explained below as an example. However, the present invention is also applicable to, for example, quantum key distribution using a phase, quantum key distribution using a frequency, and the like. There is no specific limitation on what kind of quantum state is used.

Quantum key distribution is a key distribution system, security of which is guaranteed regardless of a computing ability of a wiretapper. For example, to generate a shared key efficiently, it is necessary to remove an error of data that is caused when the data is transmitted through a transmission path. Thus, according to the present embodiment, quantum key distribution for performing error correction using a Low-Density Parity-Check (LDPC) code, which is known as having an extremely high property, is explained.

FIG. 1 is a block diagram of a structure of a quantum cryptograph system (communication apparatuses on a transmission side and a reception side) according to the present invention. This quantum cryptograph system includes the communication apparatus on the transmission side, which has a function of transmitting information $m_a$, and the communication apparatus on the reception side, which has a function of receiving the information $m_a$ affected by noise and the like on a transmission path, that is, information $m_b$.

The communication apparatus on the transmission side includes an encryption-key generating unit 1, which transmits the information $m_a$ through a quantum communication path, transmits a syndrome $S_A$ thorough a public communication path, and generates an encryption key (a common key common to the transmission side and the reception side) based on the transmitted information, and a communication unit 2 in which a transmission/reception unit 22 transmits and receives data, which is encrypted by an encryption unit 21 based on the encryption key, through the public communication path. The communication apparatus on the reception side includes an encryption-key generating unit 3, which receives the information $m_b$ through the quantum communication path, receives the syndrome $S_A$ through the public communication path, and generates an encryption key (a common key common to the reception side and the transmission side) based on information on the received information, and a communication unit 4 in which a transmission/reception unit 41 transmits and receives data, which is encrypted by an encryption unit 42 based on the encryption key, through the public communication path.

The communication apparatus on the transmission side transmits light polarized in a predetermined direction using a polarization filter to the communication apparatus on the reception side as the information $m_a$ to be transmitted on the quantum communication path. On the other hand, the communication apparatus on the reception side identifies light polarized in the horizontal direction (0°), light polarized in the vertical direction (90°), light polarized in the 45° direction, and light polarized in the 135° direction on the quantum communication path using a measuring device capable of identifying polarized light in the horizontal and vertical directions (0° and 90°) and a measuring device capable of identifying polarized light in the oblique directions (45° and 135°). Not that the respective measuring devices can recognize light polarized in the defined directions correctly. However, for example, when the measuring device, which is capable of identifying polarized light in the horizontal and vertical directions (0° and 90°), measures light polarized in an oblique direction, the measuring device identifies light polarized in the horizontal direction and light polarized in the vertical direction at random at a probability of 50 percent, respectively. In other words, when the measuring device that does not cope with identifiable polarization directions is used, it is impossible to identify a direction in which light is polarized even if a result of measurement by the measuring device is analyzed.

Figure 3:
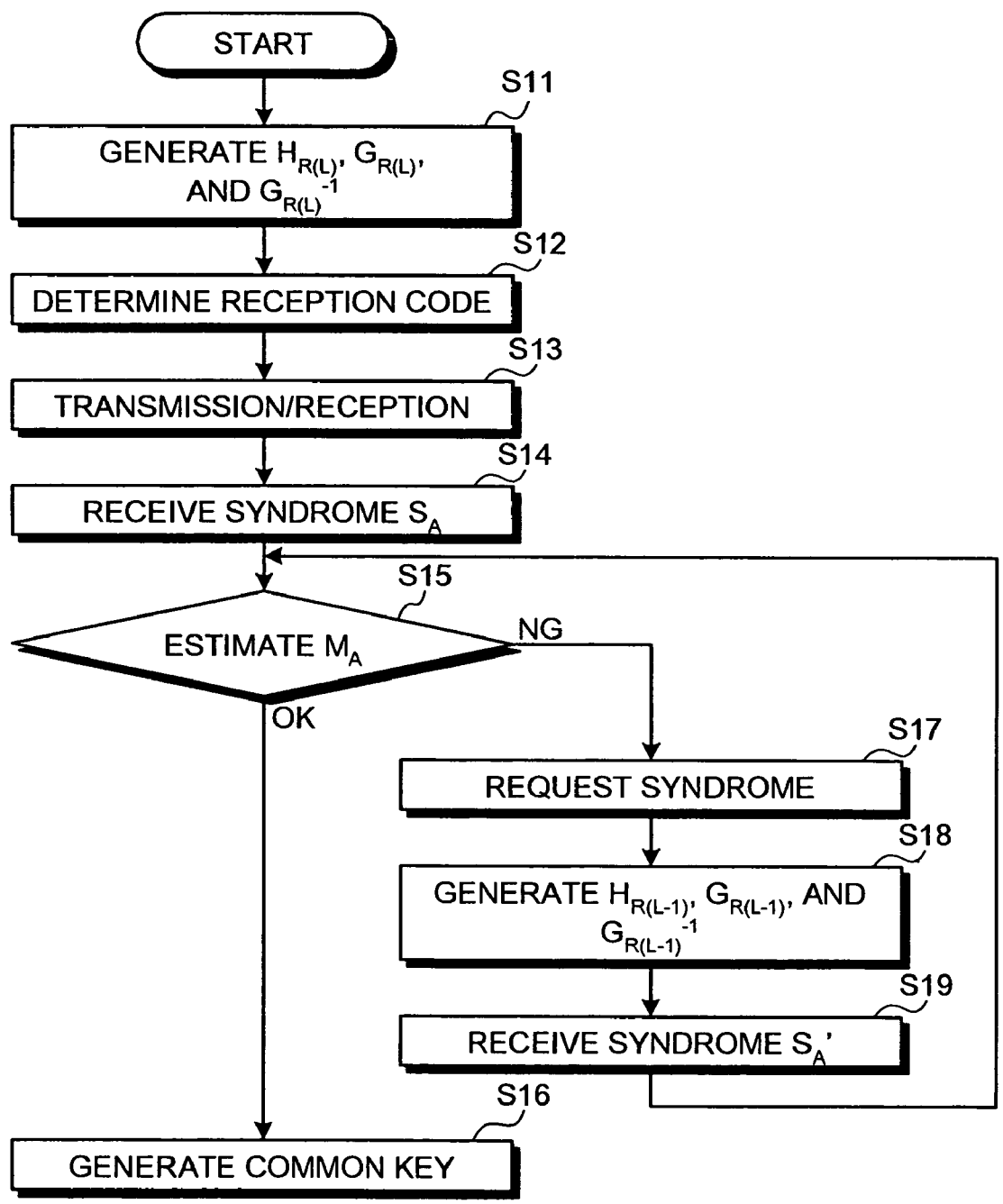
FIG. 3 is a flowchart of quantum key distribution according to the first embodiment.

Operations of the respective communication apparatuses in the quantum cryptograph system, that is, quantum key distribution according to the present embodiment is explained in detail below. FIGS. 2 and 3 are flowcharts of an outline of the quantum key distribution according to the present embodiment. Specifically, FIG. 2 is a flowchart of processing in the communication apparatus on the transmission side and FIG. 3 is a flowchart of processing in the communication apparatus on the reception side.

First, in the communication apparatus on the transmission side and the communication apparatus on the reception side, parity-check-matrix generating units 10 and 30 calculate a parity check matrix H of a specific liner code. A coding ratio is "0<R(1)<R(2)< . . . <R(max)=1 (R(max) represents non-coding)". As an example, the parity-check-matrix generating units 10 and 30 calculate a parity check matrix $H_{R(1)}$ having a coding ratio as close as possible to "0".

The parity-check-matrix generating units 10 and 30 extract a parity check matrix $H_{R(L)}$ (an n×k matrix) with an arbitrary coding ratio R(L)=(n−k)/n from the parity check matrix $H_{R(1)}$, calculate a generator matrix $G_{R(L)}$ (an (n−k)×n matrix) that satisfies "$H_{R(L)}G_{R(L)}=0$" from the parity check matrix $H_{R(L)}$, and calculate an inverse matrix $G_{R(L)}^{-1}$ (an n×(n−k) matrix) of $G_{R(L)}$ ($G_{R(L)}^{-1}*G_{R(L)}=I$ (a unit matrix)) (step S1 and step S11). For convenience of explanation, the arbitrary coding ratio R(L) is set to 0.6.

According to the present embodiment, quantum key distribution that uses an LDPC code having an excellent characteristic extremely close to the Shannon limit as the specific liner code is explained. Other liner codes such as a turbo code may be used as the specific liner code. For example, if error correction information (syndrome) described later is an error correction protocol represented by a product $Hm_A$ of an appropriate matrix H and transmission data $m_A$ (a part of information $m_a$) (e.g., an error correction protocol corresponding to the "quantum key distribution capable of correcting a data error on a transmission path" explained in the related art), or if linearity of the error correction information and the transmission data $m_A$ is secured, the matrix H may be used as a parity check matrix.

A method of forming an LDPC code in the parity-check-matrix generating unit 10 (corresponding to the processing at step S1) is explained below.

A parity check matrix for an LDPC code $C_{R(1)}$ is set as $H_{R(1)}$. The coding ratio R(l), l=1, 2, . . . , max is "0<R(1)<R(2)< . . . <R(max)=1". R(max) represents non-coding.

Figure 4:
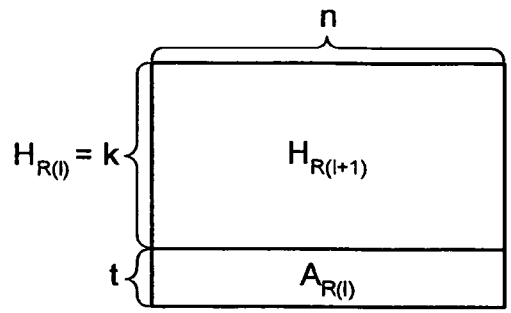
FIG. 4 is a diagram of a structure of a parity check matrix $H_{R(1)}$.

It is possible to define the parity check matrix $H_{R(l)}$ as represented by Equation (1) using a parity check matrix $H_{R(l+1)}$ and an additional parity check matrix $A_{R(1)}$. FIG. 4 is a diagram indicating Equation (1).

$$H_{R(1)} = \begin{bmatrix} H_{R(1+1)} \\ A_{R(1)} \end{bmatrix}. \tag{1}$$

Both the parity check matrix $H_{R(1)}$ and the parity check matrix $H_{R(1+1)}$ are full ranks.

According to the present embodiment, an order allocation of the parity check matrix $H_{R(1)}$, l=1, 2, . . . , max is optimized by the Gaussian approximation. In other words, an order allocation of the parity check matrix $H_{R(1)}$ that minimizes Equation (2) is calculated.

$$\sum_{l=1}^{max} GAP_{R(1)} \tag{2}$$

$GAP_{R(l)}$ is a dB representation of a difference between an SNR of an iterative threshold of the parity check matrix $H_{R(l)}$ estimated by the Gaussian approximation and a Shannon limit.

As a method of calculating an order allocation of the parity check matrix $H_{R(l)}$ that minimizes Equation (2), for example, Equation (3) is calculated. Equation (3) is a calculation for searching for $\lambda(x, R(l))$ and $\rho(x, R(l))$ that maximize the Gaussian noise $\sigma_n(R(l))$. Constrains in calculating Equation (3) are as indicated by Equations (4), (5), (6), and (7).

$$\sum_{l=1}^{max} \sigma_n(R(1)) \tag{3}$$

$$\frac{\int_0^1 \rho(x, R(1))}{\int_0^1 \lambda(x, R(1))} = 1 - R(1) \tag{4}$$

$$\lambda(x, R(1)) = \frac{\lambda_1(R(1)) + \lambda_2(R(1))x^1 + \ldots +}{\lambda_{dv(max,R(1))}(R(1))x^{dv(max,R(1))-1}}$$

$$\rho(x, R(1)) = \frac{\rho_1(R(1)) + \rho_2(R(1))x^1 + \ldots +}{\rho_{dc(max,R(1))}(R(1))x^{dc(max,R(1))-1}}$$

-continued $$\lambda(x, R(1)) = 1 \tag{5}$$
$$\rho(x, R(1)) = 1$$
$$r >$$
$$\sum_{i=2}^{dv(max,R(1))} \lambda_i(R(1))\phi\left(s + (i-1)\sum_{j=2}^{dc(max,R(1))} \rho_j(R(1))\phi^{-1}(1-(1-r)^{j-1})\right)$$

$$\forall r \in (0, \phi(s)) \tag{6}$$
$$0 \le \lambda_i(R(1)) \le 1, \ \lambda_i(R(1)) \in R$$
$$0 \le \rho_i(R(1)) \le 1, \ \rho_i(R(1)) \in R$$

$$\phi(x) = \begin{cases} 1 - \frac{1}{\sqrt{4\pi x}} \int_R \tanh\frac{u}{2} \cdot e^{-\frac{(u-x)^2}{4x}} du, & \text{if } x > 0 \\ 1, & \text{if } x \le 0 \end{cases}$$

$$\lambda_x(R(l)) \le \frac{\left(\sum_{i=2}^{x} n_v(i, R(l+1)) \times i\right) - \left(\sum_{j=2}^{x-1} n_v(j, R(l)) \times j\right)}{\text{Total number of "1"s in } H_{R(l)}} \tag{7}$$

$\lambda_i(R(l))$ represents a ratio of columns of an order i of the parity check matrix $H_{R(l)}$ and $\rho_i(R(l))$ represents a ratio of rows of the order i of the parity check matrix $H_{R(1)}$. dv(max, R(l)) represents a maximum order of columns of the parity check matrix $H_{R(l)}$ and dc(max, R(l)) represents a maximum order of rows of the parity check matrix $H_{R(l)}$. $\lambda(x, R(l))$ is a generating function of an order allocation of the columns of the parity check matrix $H_{R(l)}$ and $\rho(x, R(l))$ is a generating function of an order allocation of the rows of the parity check matrix $H_{R(1)}$. $n_v(i, R(l))$ represents the number of columns of the order i of the parity check matrix $H_{R(1)}$ and $n_c(i, R(l))$ represents the number of rows of the order i of the parity check matrix $H_{R(l)}$.

Figure 5:
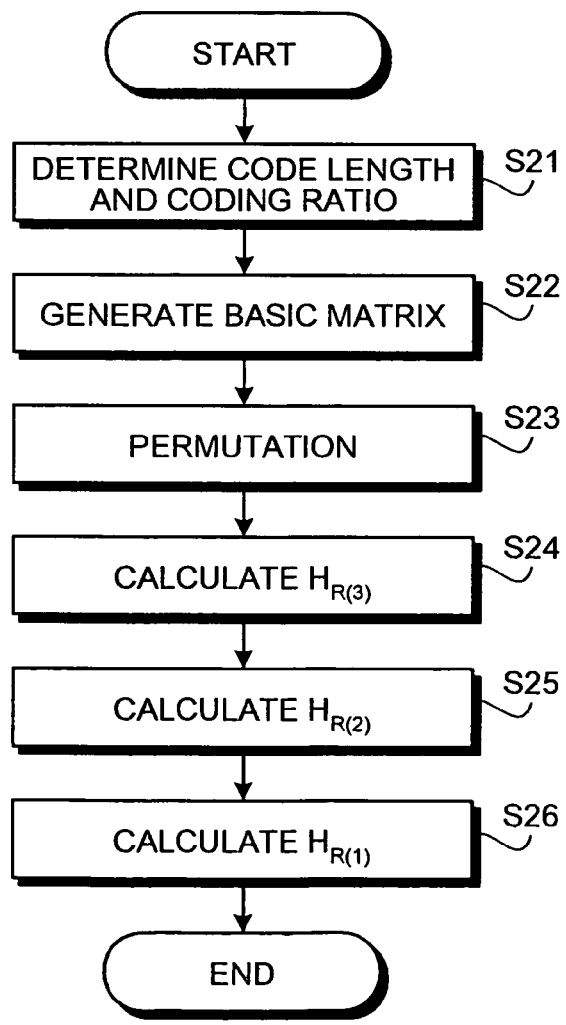
FIG. 5 is a flowchart of a method of forming an "Irregular-LDPC code" based on a Euclidian geometric code.

As an example of processing for calculating the parity check matrix $H_{R(l)}$ at step S1, processing for calculating a parity check matrix $H_{R(3)}$, a parity check matrix $H_{R(2)}$, and a parity check matrix $H_{R(1)}$ in order is specifically explained below. FIG. 5 is a flowchart of a method of forming an "Irregular-LDPC code" based on the Euclidian geometric code. Since the parity-check-matrix generating unit 30 operates in the same manner as the parity-check-matrix generating unit 10, an explanation of the parity-check-matrix generating unit 30 is omitted. Check matrix generation processing according to the present embodiment may be executed by, for example, the parity-check-matrix generating unit 10 or other control apparatuses (a computer, etc.) on the outside of the communication apparatus according to parameters set. When the check matrix generation processing according to the present embodiment is executed on the outside of the communication apparatus, a check matrix already generated is stored in the communication apparatus. In the explanation of the embodiment below, the parity-check-matrix generating unit 10 executes the processing.

First, the parity-check-matrix generating unit 10 determines a code length and coding ratios (step S21 in FIG. 5). For example, the code length n is set to 5000 and the coding ratios R(3), R(2), and R(1) are set to 0.6, 0.4, and 0.0, respectively.

The parity-check-matrix generating unit 10 selects a Euclidian geometric code EG(2, $2^S$) and generates fundamental-matrixes A (s=5, R(3)), A(s=5, R(2)), and A(s=5, R(1)) forming a basis of a check matrix for the "Irregular-LDPC code" (step S22). For example, when s is set to 5, a weight distribution (column numbers of "1") in a first row of a Euclidian geometric code EG(2, 2⁵) is as follows.

{1 32 114 136 149 223 260 382 402 438 467 507 574 579 588 622 634 637 638 676 717 728 790 851 861 879 947 954 971 977 979 998}

In coding and decoding using the LDPC code, in general, it is possible to obtain a more satisfactory characteristic when there are fewer "cycles 4" and "cycles 6" in a bipartite graph. Thus, according to the present embodiment, "1" is appropriately curtailed from the weight distribution on the first row of the Euclidian geometric code EG(2, 2⁵) to control fewer number of cycles such as the "cycles 4" and the "cycles 6). A weight distribution after curtailment, for example, as follows.

{1 32 114 136 149 223 260 402 438 467 507 574 588 634 638 717 728 790 861 947 971 979}

Weight distributions on first rows of the respective basis matrixes are determined on the basis of the weight distribution after curtailment (positions of "1" are allocated individually). The weight distributions are cyclically shifted to generate fundamental-matrixes A (s=5, R(3)), A(s=5, R(2)), and A(s=5, R(1)) with 1023 rows×1023 columns. According to the present embodiment, weight distributions on the first rows of the respective fundamental-matrixes are determined, for example, as follows.

A(s=5, R(3))={1 32 114 149 260 402 467 507 574 634 717 728 790 861 979}

A(s=5, R(2))={223 438 947}

A(s=5, R(1))={136 588 638 971}

Consequently, a maximum order of columns of the parity check matrix $H_{R(3)}$ dv(max, R(3)) is 15, a maximum order of columns of the parity check matrix $H_{R(2)}$ dv(max, R(2)) is 3, and a maximum order of columns of the parity check matrix $H_{R(1)}$ dv(max, R(1))) is 4. A maximum order of rows of the parity check matrix HR(3) dc(max, R(3)) is 15, a maximum order of rows of the parity check matrix HR(2) dc(max, R(2)) is 3, and a maximum order of rows of the parity check matrix HR(1) dc(max, R(1)) is 4.

The parity-check-matrix generating unit 10 permutes the respective fundamental-matrixes according to a procedure described below to place a position of "1" as high as possible in a column (step S23). In general, the permutation procedure is represented as indicated by Equation (8).

$$h_k(X) \in GF(2)[X]/X^{(2^{2s}-1)} \qquad (8)$$

$$k = \{1, 2, \ldots, 2^2 \cdot (2^{2s} - 1)\}$$

$$\begin{bmatrix} h_{i+0}(X) \\ h_{i+1}(X) \\ h_{i+2}(X) \\ \vdots \\ \vdots \end{bmatrix} = \begin{bmatrix} X^{-(w1-1)} \\ X^{-(w2-1)} \\ X^{-(w3-1)} \\ \vdots \\ \vdots \end{bmatrix} \cdot [(X^{(w1-1)} + X^{(w2-1)} + \ldots) \cdot X^{(i-1)}]$$

In Equation (8), i is set as 1–2²ˢ–1. A polynomial $(X^{(w1-1)}+X^{(w2-1)}+\ldots)$ is an Equation representing first rows of the respective fundamental-matrixes. For example, when positions of a weight of a basic row is {1 7 9 ... 40}, a first row of the fundamental-matrix is $1+X^{(7-1)}+X^{(9-1)}+\ldots X^{(40-1)}$.

In Equation (8), when there are i and j that make $h_i(X)$ equal to $h_j(X)$ when i is 1 to $2^{2s}-1$ and j is 1 to i–1, $h_i(X)$ is deleted. According to the permutation, when processing for deleting (processing for reducing) rows described later is performed, it is possible to keep columns with as large weights as possible and reduce variations of weights in columns as much as possible.

Figure 6:
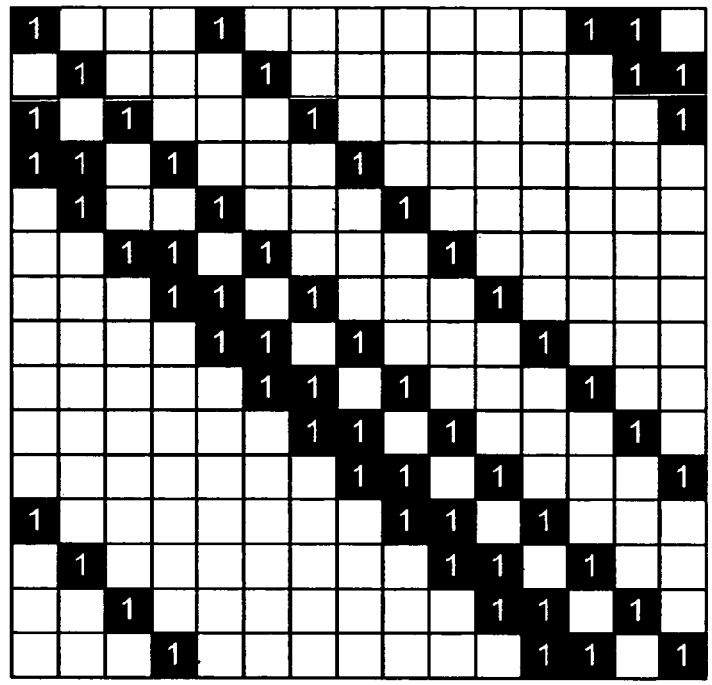
FIG. 6 is a diagram of a matrix of a Euclidian geometric code $EG(2, 2^2)$.
Figure 7:
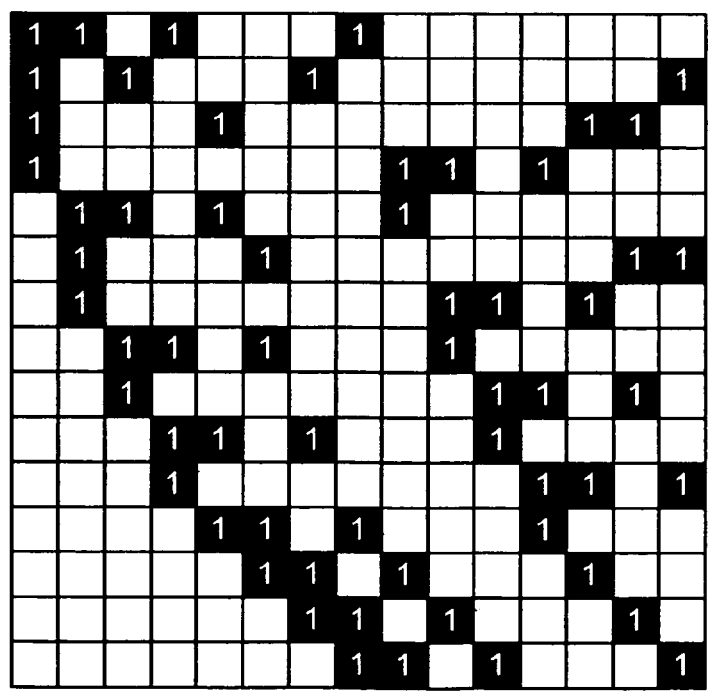
FIG. 7 is a diagram of a matrix after permutation.

As a specific example, for example, when a Euclidian geometric code EG (2, 2²) is set as a fundamental-matrix, a matrix shown in FIG. 6 is permuted like a matrix shown in FIG. 7 by carrying out the permutation procedure described above. FIG. 6 is a diagram of a matrix of the Euclidian geometric code EG (2, 2²) (blanks represent 0). FIG. 7 is a diagram of a matrix after permutation.

The parity-check-matrix generating unit 10 executes processing for calculating a parity check matrix $H_{R(3)}$ with 2000 rows×5000 columns (optimization calculation) using the code length n=5000, the coding ratio R(3)=0.6, and the fundamental-matrix A (s=5, R(3)) after permutation determined above (step S24).

First, the parity-check-matrix generating unit 10 searches for generating functions λ(x, R(3)) and ρ(x, R(3)) that maximize Gaussian noise $σ_n(R(3))$. In this case, Equations (4), (5), and (6) are constraints. FIG. 8 is a table of an order allocation after the optimization calculation.

The parity-check-matrix generating unit 10 calculates a reduced matrix based on the fundamental-matrix A(s=5, R(3)), the key length [translator's comment: "key length" should be corrected to "code length"] n=5000, and the coding ratio R(3)=0.6. For example, when μ∈Z (a positive integer) is the number of a row of an order i divided from one row of the basis matrix A(s, R(l)), the number of divisions of a row is represented by Equation (9).

$$\sum_{i=1}^{dc(max,R(1))} \rho_i(R(1)) \times \mu_i = 1 \qquad (9)$$

$$\text{Number of divisions of a row} = \sum_{i=1}^{dc(max,R(1))} \mu_i$$

In the explanation in FIG. 8, $7μ_7/15+8μ_8/15=1$ ($μ_7=1$, $μ_8=1$). Thus, the number of divisions of a row is "1+1=2".

The number of rows of the reduced matrix is represented by Equation (10).

Number of rows of the reduced matrix=n×(1−R(3))/
number of divisions of a row=5000×(1−0.6)/
2=1000 (10)

This means that the parity-check-matrix generating unit 10 deletes twenty-three rows from the bottom of the basic row A(s=5, R(3)) with 1023 rows to generate a reduced matrix A'(s=5, R(3)) with 1000 rows.

Thereafter, the parity-check-matrix generating unit 10 calculates, with an order ratio $ρ_i(R(3))$ of a row and an order i of the row shown in FIG. 8 fixed, the number of columns $n_v(i, R(3))$ of orders i=2, 3, and 4 of the parity check matrix $H_{R(3)}$ and the number of rows $n_c(i, R(3))$ of orders i=7 and 8 of the parity check matrix $H_{R(3)}$ that can be formed using the reduced matrix A'(s=5, R(3)). An order ratio $λ_i(R(3))$ of rows is adjusted to set the number of columns of a matrix after division to 5000. FIG. 9 is a table of order allocation after adjustment.

Figure 10:
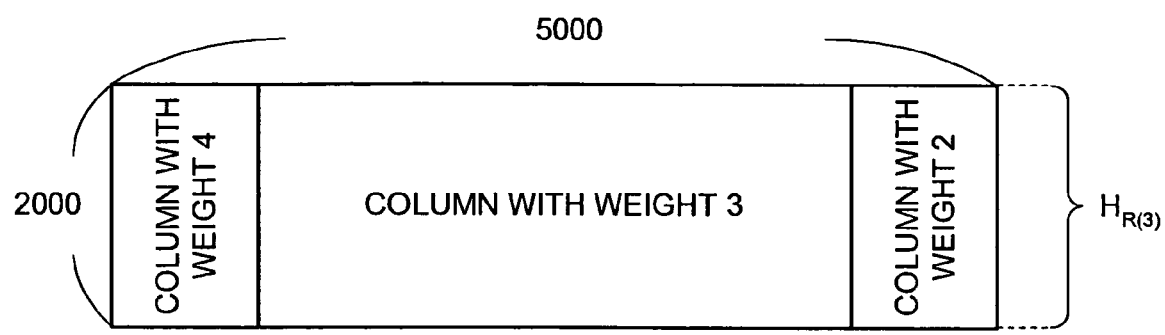
FIG. 10 is a diagram of a parity check matrix $H_{R(3)}$.

Thereafter, the parity-check-matrix generating unit 10 divides rows and columns of the reduced matrix A'(s=5, R(3)) based on the order allocation shown in FIG. 9 and sets a result of the division as a parity check matrix $H_{R(3)}$' with 2000 rows×5000 columns. Moreover, the parity-check-matrix generating unit 10 permutes the columns to arrange weights of the columns of the parity check matrix $H_{R(3)}'$ after division in a descending order and sets a matrix after permutation as a parity check matrix $H_{R(3)}$. FIG. 10 is a diagram of the parity check matrix $H_{R(3)}$. There are 1000 rows with a weight "7", 1000 rows with a weight "8", 279 columns with a weight "2", 4442 columns with a weight "3", and 279 columns with a weight "4".

The division processing for a reduced matrix according to the present embodiment (including division processing described later) is performed by extracting "1" from the respective rows and the respective columns at random (random division) rather than regularly dividing the matrix. Any method may be used for this extraction processing as long as the randomness is maintained.

The parity-check-matrix generating unit 10 executes processing for calculating a parity check matrix $H_{R(2)}$ and an additional matrix $A_{R(2)}$ in Equation (11) (optimization calculation) using the code length n=5000, the coding ratio R(2)=0.4, and the fundamental-matrix A(s=5, R(2)) after permutation determined above (step S25). Only processing different from the processing for calculating the parity check matrix $H_{R(3)}$ is explained.

$$H_{R(2)} = \begin{bmatrix} H_{R(3)} \\ A_{R(2)} \end{bmatrix} \quad (11)$$

The parity-check-matrix generating unit 10 searches for generating functions $\lambda(x, R(2))$ and $\rho(x, R(2))$ that maximize Gaussian noise $\sigma_n(R(2))$. In this maximization calculation, Equation (7) is a constraint in addition to Equations (4), (5), and (6). Specifically, it is a constraint that Equation (12) generated based on Equation (7) is satisfied.

$$\lambda_x(R(l-1)) \leq \frac{\left(\sum_{i=2}^{x} n_v(i, R(l)) \times i\right) - \left(\sum_{j=2}^{x-1} n_v(j, R(l-1)) \times j\right)}{\text{Total number of "1"s in } H_{R(l-1)}} \quad (12)$$

Therefore, for example, constraints of an order 2, an order 3, and an order 4 in the parity check matrix $H_{R(2)}$ are Equation (13), Equation (14), and Equation (15), respectively.

$$\lambda_2 \leq \frac{n_v(2, R(1)) \times 2}{1000 \times 15 + 1000 \times 3}$$
$$= \frac{279 \times 2}{18000}$$
$$= 0.031 \quad (13)$$

$$\lambda_3 \leq \frac{n_v(3, R(1)) \times 3 + n_v(2, R(1)) \times 2 - n_v(2, R(1-1)) \times 2}{1000 \times 15 + 1000 \times 3} \quad (14)$$
$$= \frac{4686 \times 3 + 279 \times 2 - n_v(2, R(1-1)) \times 2}{6 \times 5000 \times 0.6}$$
$$= 0.812 - \frac{n_v(2, R(1-1))}{9000}$$

$$\lambda_4 \leq \frac{n_v(4, R(1)) \times 4 + n_v(3, R(1)) \times 3 + n_v(2, R(1)) \times 2 - (n_v(3, R(1-1)) \times 3 + n_v(2, R(1-1)) \times 2)}{1000 \times 15 + 1000 \times 3} \quad (15)$$
$$= \frac{96 \times 4 + 4686 \times 3 + 279 \times 2 - (n_v(3, R(1-1)) \times 3 + n_v(2, R(1-1)) \times 2)}{18000}$$
$$= 0.833 - \frac{(n_v(3, R(1-1)) \times 3 + n_v(2, R(1-1)) \times 2)}{18000}$$

Moreover, it is also a constraint that a maximum order of columns of the parity check matrix $H_{R(2)}$ satisfies Equation (16).

Maximum order of columns of $H_{R(2)}$=maximum order of columns of $H_{R(3)}$+number of elements of A(s=5, R(2)) (16)

FIG. 11 is a table of order allocation obtained as a result of the optimization calculation.

On the other hand, the parity-check-matrix generating unit 10 calculates a reduced matrix A'(s=5, R(2)) according to the same processing as Equation (9) and Equation (10) using the number of elements of the fundamental-matrix A(s=5, R(2)), the code length n=5000, and the coding ratio R(2)=0.4.

In the example in FIG. 11, $3\mu_3/18+7\mu_7/18+8\mu_8/18=1$ ($\mu_3=1$, $\mu_7=1$, and $\mu_8=1$). Thus, the number of division of a row is "1+1+1=3".

The parity-check-matrix generating unit 10 deletes twenty-three rows from the bottom of the basic row A(s=5, R(2)) with 1023 rows to generate a reduced matrix A'(s=5, R(2)) with 1000 rows.

Figure 12:
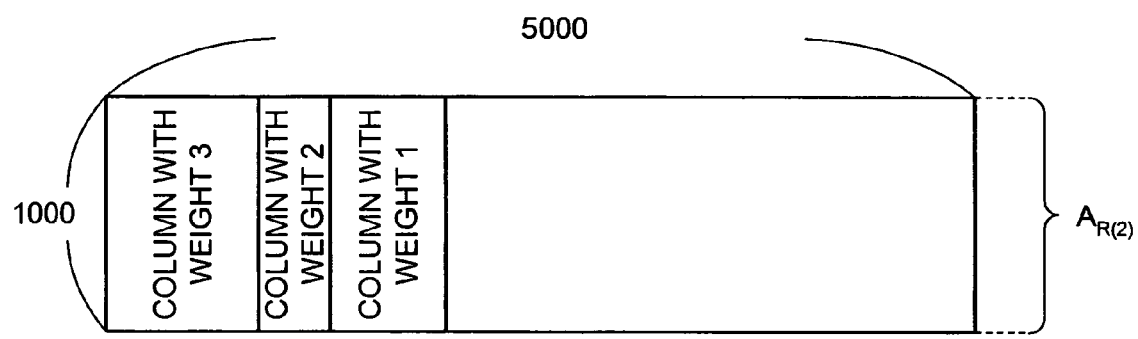
FIG. 12 is a diagram of an additional matrix $A_{R(2)}$.
Figure 13:
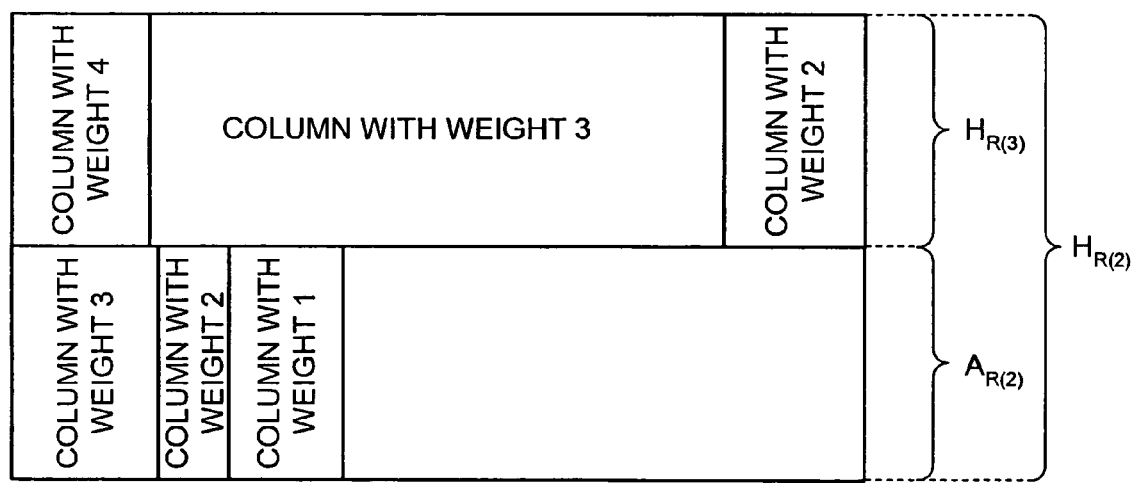
FIG. 13 is a diagram of a parity check matrix $H_{R(2)}$.

Thereafter, the parity-check-matrix generating unit 10 divides columns of the reduced matrix A'(s=5, R(2)) based on the order allocation shown in FIG. 11 and sets a result of the division as a provisional additional matrix $A_{R(2)}'$ with 1000 rows ×5000 columns. Moreover, the parity-check-matrix generating unit 10 permutes the columns to arrange weights of the columns of the provisional additional matrix $A_{R(2)}'$ after division in a descending order and sets a matrix after permutation as a formal additional matrix $A_{R(2)}$. FIG. 12 is a diagram of the additional matrix $A_{R(2)}$. There are 1000 rows with a weight "3", 150 rows with a weight "1", 6 columns with a weight "2", and 946 columns with a weight "3". FIG. 13 is a diagram of a parity check matrix $H_{R(2)}$.

Finally, the parity-check-matrix generating unit 10 executes processing for calculating a parity check matrix $H_{R(1)}$ and an additional matrix $A_{R(1)}$ in Equation (17) (optimization calculation) using the code length n=5000, the coding ratio R(2)=0.0, the fundamental-matrix A(s=5, R(1)), and the parity check matrix $H_{R(2)}$ determined above (step S26). This processing is performed in the same procedure as the processing for calculating the parity check matrix $H_{R(2)}$.

$$H_{R(1)} = \begin{bmatrix} H_{R(2)} \\ A_{R(1)} \end{bmatrix} \quad (17)$$

Figure 14:
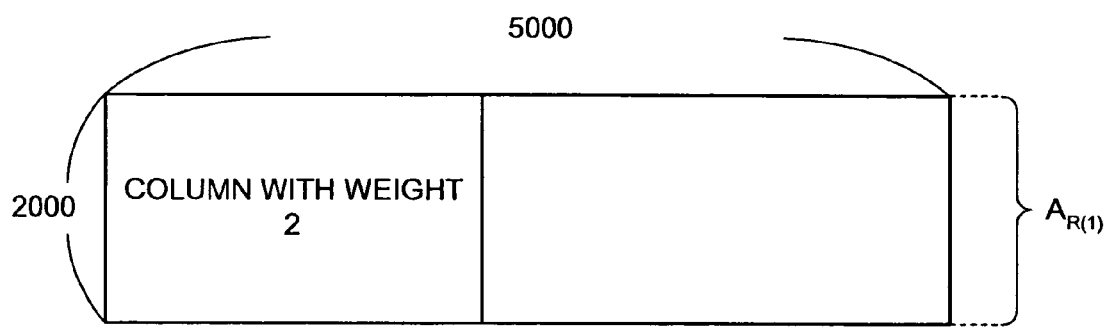
FIG. 14 is a diagram of a specific example of an additional matrix $A_{R(1)}$.
Figure 15:
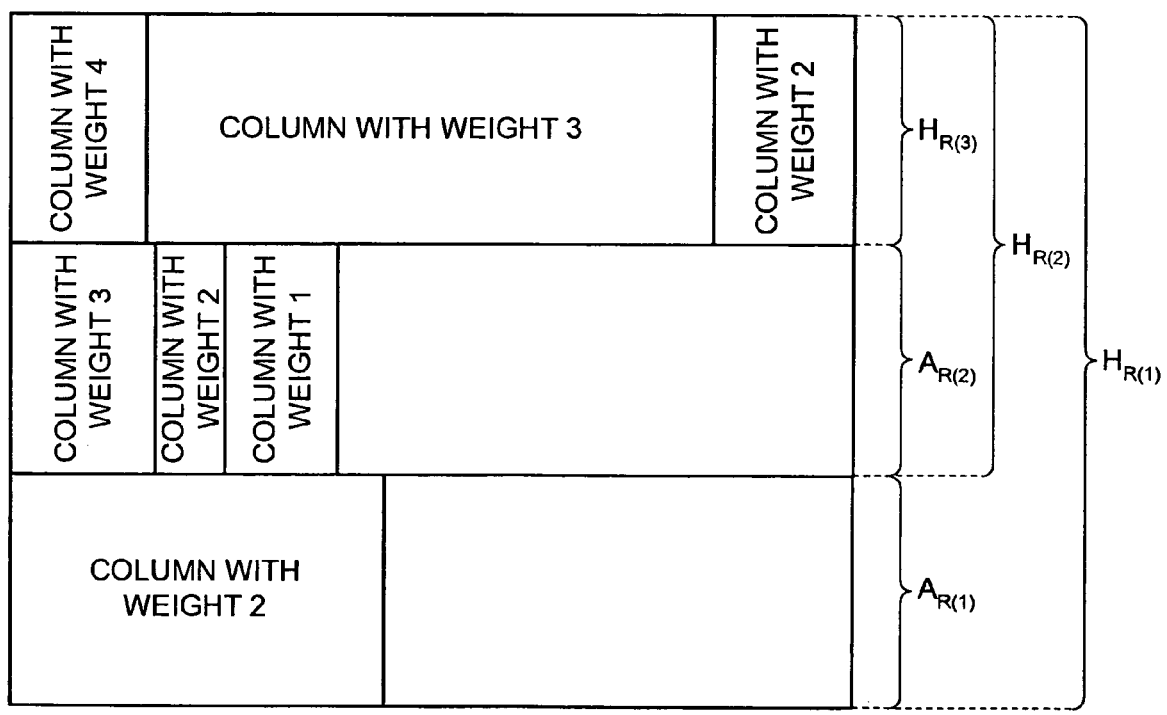
FIG. 15 is a diagram of a specific example of the parity check matrix $H_{R(1)}$.

Thereafter, the parity-check-matrix generating unit 10 divides rows and columns of a reduced matrix A' (s=5, R(1)) based on an order allocation obtained as a result of the calculation and sets a result of the division as a provisional additional matrix $A_{R(1)}'$ with 2000 rows×5000 columns. Moreover, the parity-check-matrix generating unit 10 permutes the columns to arrange weights of the columns of the provisional additional matrix $A_{R(1)}'$ after division in an ascending order and sets a matrix after permutation as a formal additional matrix $A_{R(1)}$. FIG. 14 is a diagram of a specific example of the additional matrix $A_{R(1)}$. FIG. 15 is a diagram of a specific example of the parity check matrix $H_{R(1)}$.

In this way, according to the present embodiment, it is possible to generate the check matrixes $H_{R(3)}$, $H_{R(2)}$, and $H_{R(1)}$ for the "Irregular-LDPC code", which are definite and have stable characteristics, by executing steps S21 to S26.

According to the present embodiment, the Euclidian geometric code is used as a code forming a basis (a fundamental-matrix). However, the present invention is not limited to this. Matrixes other than the Euclidian geometric code (a fundamental-matrix according to a Cayley graph, a fundamental-matrix according to a Ramanujan graph, etc.) may be used as long as the matrixes satisfy a condition that weights of rows and columns are fixed and the number of cycles on a bipartite graph is equal to or more than six.

According to the present embodiment, the parity check matrix $H_{R(1)}$ with a coding ratio as close as possible to "0" is finally generated. However, the present invention is not limited to this. Parity check matrixes with sizes ($H_{R(2)}$, $H_{R(3)}$, $H_{R(4)}$, etc.) may be generated in advance as required according to a communication environment. According to the present embodiment, the parity check matrixes in three stages are assumed. However, parity check matrixes may be formed in any number of stages as long as a satisfactory characteristic is obtained.

After the parity check matrix $H_{R(1)}$ and generator matrixes $G_{R(L)}$ and $G^{-1}_{R(L)}$ are generated as described above, in the communication apparatus on the transmission side, a random-number generating unit 11 generates a random number sequence $m_a$ (a sequence of 1 and 0: transmission data) and determines transmission codes (+: a code corresponding to a measuring device capable of identifying light deflected in the horizontal and vertical directions, ×: a code corresponding to a measuring device capable of identifying light polarized in an oblique direction) at random (step S2 in FIG. 2). On the other hand, in the device on the reception side, a random-number generating unit 31 determines reception codes (+: a code corresponding to the measuring device capable of identifying light polarized in the horizontal and vertical directions, ×: a code corresponding to the measuring device capable of identifying light polarized in an oblique direction) at random (step S12 in FIG. 3).

Subsequently, in the communication apparatus on the transmission side, a photon generating unit 12 transmits a photon in a polarizing direction automatically determined according to a combination of the random number sequence $m_a$ and the transmission codes (step S3). For example, the photon generating unit 12 transmits light polarized in the horizontal direction according to a combination of 0 and +, light polarized in the vertical direction according to a combination of 1 and +, light polarized in the 45° direction according to a combination of 0 and ×, and light polarized in the 135° direction according to a combination of 1 and × to a quantum communication path, respectively (transmission signals).

A photon receiving unit 32 of the communication apparatus on the reception side, which has received light signals of the photon generating unit 12, measures light on the photon communication path (reception signals). The photon receiving unit 32 obtains reception data $m_b$ automatically determined according to a combination of a reception code and a reception signal (step S13). The photon receiving unit 32 obtains, as the reception data $m_b$, 0, 1, 0, and 0 according to a combination of the light polarized in the horizontal direction and +, a combination of the light polarized in the vertical direction and +, a combination of the light polarized in the 45° direction and ×, and a combination of the light polarized in the 135° direction and ×, respectively. The reception data $m_b$ is assumed to be a hard decision value with probability information.

In the communication apparatus on the reception side, to check whether the measurement is performed by a correct measuring device, the random-number generating unit 31 transmits a reception code to the communication apparatus on the transmission side via a public communication path (step S13). The communication apparatus on the transmission side, which has received the reception code, checks whether the measurement is performed by a correct measuring device and transmits a result of the check to the communication apparatus on the reception side via the public communication path (step S3). The communication apparatus on the reception side and the communication apparatus on the transmission side keep only data corresponding to a reception signal received by the correct measuring device and discard the other data (steps S3 and S13). Thereafter, the communication apparatus on the reception side and the communication apparatus on the transmission side store the data kept in memories or the like, read out n bits in order from the top of the data, and set the n bits of data as formal transmission data $m_A$ and formal reception data $m_B$ ($m_B$ is $m_A$ affected by noise and the like on the transmission path: $m_B=m_A+e$ (noise and the like)). In other words, the communication apparatus on the reception side and the communication apparatus on the transmission side read out the next n bits as required and generate the transmission data $m_A$ and the reception data $m_B$. According to the present embodiment, the communication apparatus on the reception side and the communication apparatus on the transmission side can share bit positions of the data kept. Like the reception data $m_b$, the reception data $m_B$ is a hard decision value with probability information.

Figure 16:
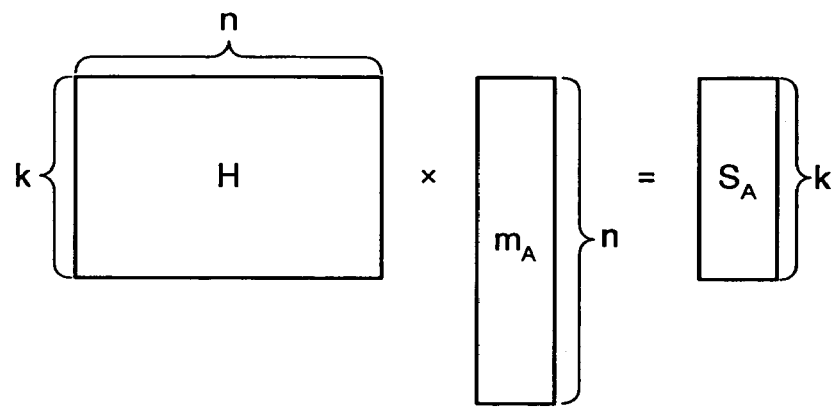
FIG. 16 is a diagram of a syndrome $S_A$ that a communication apparatus on a transmission side transmits to a communication apparatus on a reception side.

In the communication apparatus on the transmission side, a syndrome generating unit 14 calculates a syndrome $S_A=H_{R(L)}m_A$ of $m_A$ using the parity check matrix $H_{R(L)}$ (an n×k matrix) and the transmission data $m_A$ and notifies the communication apparatus on the reception side of a result of the calculation via a public-communication-path communication unit 13 and the public communication path (step S4). At this stage, it is likely that the syndrome $S_A$ of $m_A$ is learnt by a wiretapper. FIG. 16 is a diagram of the syndrome $S_A$ that the communication apparatus on the transmission side transmits to the communication apparatus on the reception side. On the other hand, in the communication apparatus on the reception side, a public-communication-path communication unit 34 receives the syndrome $S_A$ of $m_A$ and notifies a syndrome decoding unit 33 of the syndrome $S_A$ (step S14).

The syndrome decoding unit 33 estimates the original transmission data $m_A$ by correcting an error of the hard decision value $m_B$ with probability information due to noise or the like using the known syndrome decoding method (step S15). According to the present embodiment, for example, the syndrome decoding unit 33 estimates mc satisfying "$S_A=H_{R(L)}m_C$" from the hard decision value $m_B$ with probability information and sets a result of the estimation as shared information $m_A$. According to the present embodiment, the reception data $m_B$ and $m_b$ are hard decision values with probability information. However, the present invention is not limited to this. For example, the present invention is also applicable when the reception data $m_B$ and $m_b$ are soft decision values. It is not specifically defined what kind of reception data is used.

When the error of the hard decision value $m_B$ is completely corrected by processing at step S15 ("OK" at step S15), in the communication apparatus on the reception side, a common-key generating unit 35 discards a part of the shared information $m_A$ according to error correction information laid open to the public (information for the k bits that is likely to have been wiretapped: $S_A$) and generates an encryption key r including an amount of information for n−k bits (step S16). In other words, the common-key generating unit 35 generates the encryption key r according to Equation (18) using $G_{R(L)}^{-1}$ (an n×(n−k) matrix) calculated earlier. The communication apparatus on the reception side uses the encryption key r as a common key to be shared with the communication apparatus on the transmission side.

$$r = G_{R(L)}^{-1} m_A \qquad (18)$$

In the communication apparatus on the transmission side, when the error of the hard decision value $m_B$ is completely corrected by the processing at step S15 and a new syndrome request is not received ("Yes" at step S5), a common-key generating unit 15 discards a part of the shared information $m_A$ according to the error correction information laid open to the public (the information for k bits that is likely to have been wiretapped: $S_A$) and generates an encryption key r including an amount of information for n−k bits (step S6). In other words, the common-key generating unit 15 generates the encryption key r according to Equation (18) using $G_{R(L)}^{-1}$ (an n×(n−k) matrix) calculated earlier (step S6). The communication apparatus on the transmission side uses the encryption key r as a common key to be shared with the communication apparatus on the reception side.

Moreover, according to the present embodiment, the common key may be permuted using a regular random matrix R. This makes it possible to reinforce confidentiality. Specifically, first, the communication apparatus on the transmission side generates the regular random matrix R (an (n−k)×(n−k) matrix) and notifies the communication apparatus on the reception side of the regular random matrix R via the public communication path. This processing may be performed in the communication apparatus on the reception side. Thereafter, the communication apparatuses on the transmission side and the reception side generate the encryption keys r according to Equation (19) using $G_{R(L)}^{-1}$ (an n×(n−k) matrix) calculated earlier.

$$r = R G_{R(L)}^{-1} m_A \qquad (19)$$

On the other hand, when the error of the hard decision value $m_B$ is not completely corrected by the processing at step S15 ("NG" at step S15), the syndrome decoding unit 33 of the communication apparatus on the reception side notifies the communication apparatus on the transmission side of a syndrome request via the public-communication-path communication unit 34 and the public communication path (step S17). The parity-check-matrix generating unit 30 extracts a parity check matrix $H_{R(L-1)}$ (an n×(k+t) matrix) with a coding ratio R(L−1)=(n−k−t)/n from the parity check matrix $H_{R(1)}$ (lowers the coding ratio), generates a generator matrix $G_{R(L-1)}$ satisfying "$H_{R(L-1)} G_{R(L-1)} = 0$" from the parity check matrix $H_{R(L-1)}$, and further generates an inverse matrix $G_{R(L-1)}^{-1}$ of $G_{R(L-1)}$ ($G_{R(L-1)}^{-1} * G_{R(L-1)} = I$ (a unit matrix)) (step S18).

Figure 17:
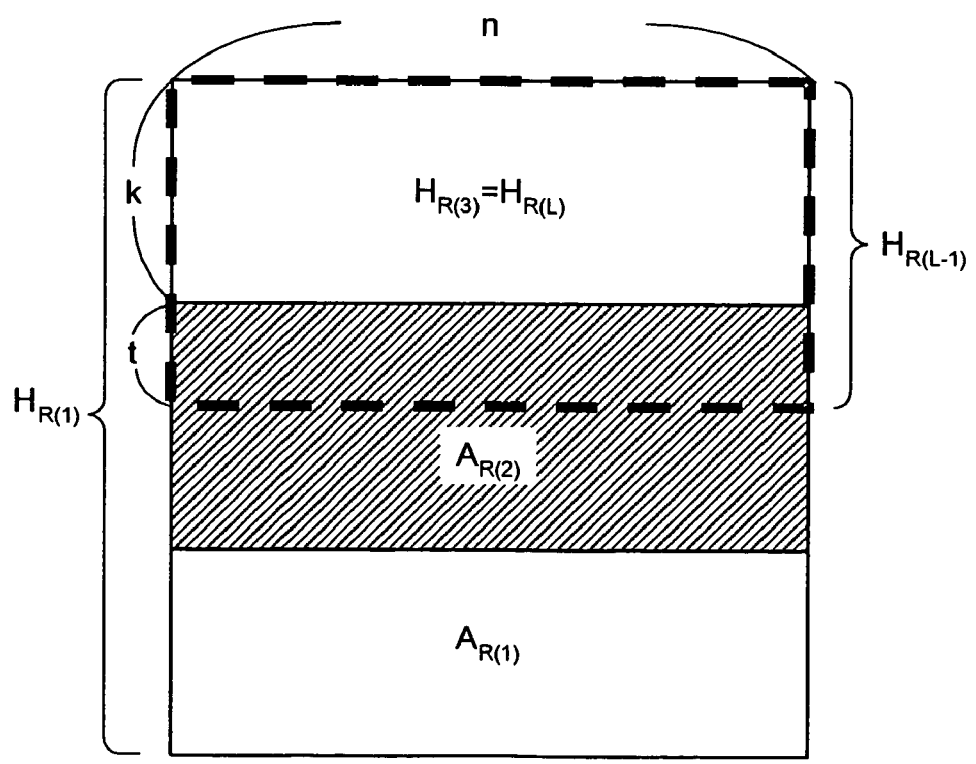
FIG. 17 is a diagram for explaining how a parity check matrix $H_{R(L-1)}$ is extracted from the parity check matrix $H_{R(1)}$.

FIG. 17 is a diagram for explaining how the parity check matrix $H_{R(L-1)}$ is extracted from the parity check matrix $H_{R(1)}$. According to the present embodiment, as shown in the figure, a parity check matrix at the time of transmission of an additional syndrome is generated by slicing a parity check matrix with a size corresponding to a coding ratio from the parity check matrix $H_{R(1)}$ generated in advance. In other words, it is possible to easily generate a parity check matrix with a size corresponding to a coding ratio without executing optimization calculation corresponding to the coding ratio (the Gaussian approximation) every time.

A lowering range of a coding ratio depends on required conditions of a system. For example, when the lowering range of a coding ratio is set small, although it is likely that the number of times of error correction processing is increased, a key generation ratio is improved. When the lowering range of a coding ratio is set large, although it is possible to reduce the number of times of error correction processing, a key generation ratio falls.

Similarly, the parity-check-matrix generating unit 10 of the communication apparatus on the transmission side, which has received the syndrome request ("No" at step S5), extracts a parity check matrix $H_{R(L-1)}$ (an n×(k+t) matrix) with a coding ratio R(L−1)=(n−k−t)/n from the parity check matrix $H_{R(1)}$, generates a generator matrix $G_{R(L-1)}$ satisfying "$H_{R(L-1)} G_{R(L-1)} = 0$" from the parity check matrix $H_{R(L-1)}$, and further generates an inverse matrix $G_{R(L-1)}^{-1}$ of $G_{R(L-1)}$ ($G_{R(L-1)}^{-1} * G_{R(L-1)} = I$ (a unit matrix)) (step S7).

Figures 18, 19:
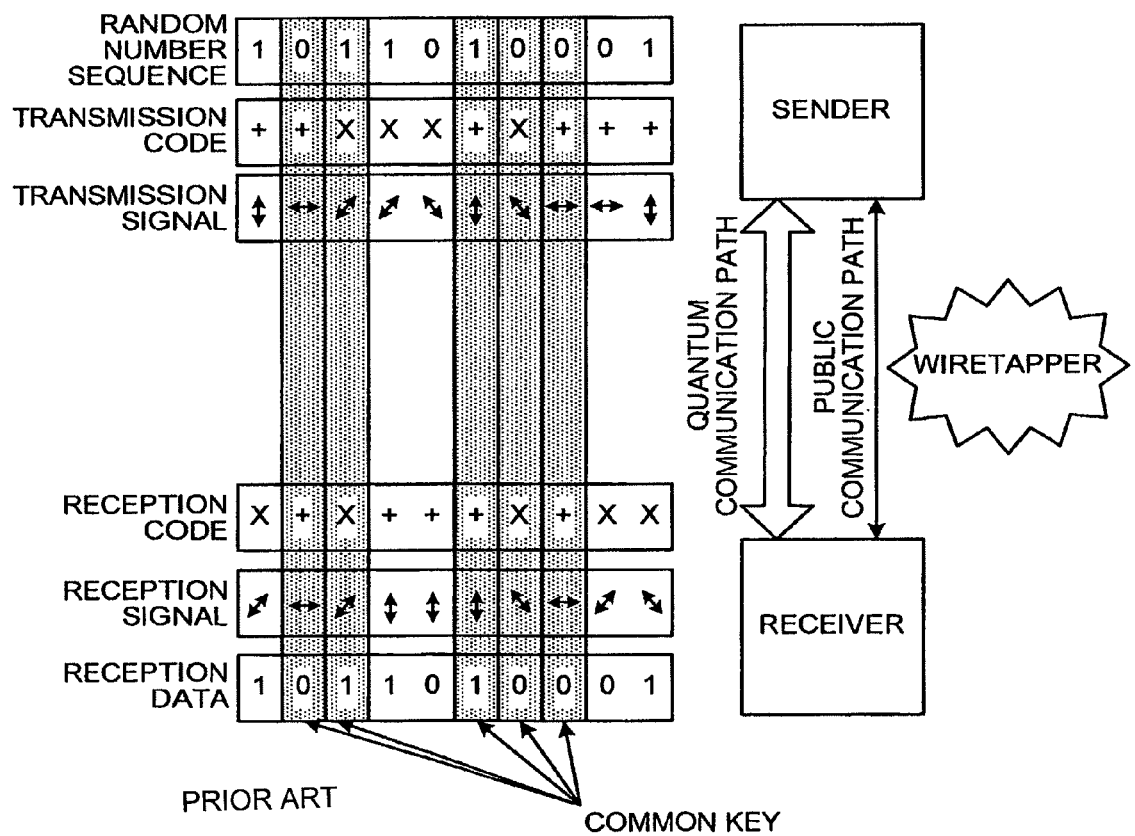
FIG. 18 is a diagram of a method of generating an additional syndrome.
FIG. 19 is a diagram of conventional quantum key distribution that uses polarization.

In the communication apparatus on the transmission side, the syndrome generating unit 14 calculates a syndrome $S_A'$ for t rows using the parity check matrix $H_{R(L-1)}$ (an n×(k+t) matrix) and the transmission data $m_A$ and notifies the communication apparatus on the reception side of a result of the calculation via the public-communication-path communication unit 13 and the public communication path (step S8). FIG. 18 is a diagram of a method of generating an additional syndrome. At this stage, it is likely that the syndrome $S_A'$ (information for t bits) is learnt by a wiretapper. In the communication apparatus on the reception side, the public-communication-path communication unit 34 receives the syndrome $S_A'$ for t rows and notifies the syndrome decoding unit 33 of the syndrome $S_A'$ (step S19).

The syndrome decoding unit 33 corrects an error of the hard decision value $m_B$ with probability information and estimates the original transmission data $m_A$ again using the known syndrome decoding method (step S15).

Thereafter, in the communication apparatus on the reception side according to the present embodiment, a desired parity check matrix is extracted from the parity check matrix $H_{R(1)}$ to repeatedly execute the processing at steps S17 to S19 while a coding ratio is lowered until the error of the hard decision value $m_B$ is completely corrected by the processing at step S15. When the error is completely corrected, the common-key generating unit 35 discards a part of the shared information $m_A$ according to error correction information laid open to the public (e.g., the information for k+t bits that is likely to have been wiretapped: $S_A + S_A'$ (see FIG. 18)). The common-key generating unit 35 generates, for example, an encryption key r including an amount of information for n−k−t, n−k−2t, n−k−3t, ... bits (step S16). The communication apparatus on the reception side uses the encryption key r as a common key to be shared with the communication apparatus on the transmission side.

In the communication apparatus on the transmission side according to the present embodiment, a desired parity check matrix is extracted from the parity check matrix $H_{R(1)}$ to repeatedly execute the processing at steps S7 and S8 while a coding ratio is lowered until a new syndrome request is not notified any more. When a new syndrome request is not notified any more, the common-key generating unit 15 discards a part of the shared information $m_A$ according to error correction information laid open to the public (e.g., the information for k+t bits that is likely to have been wiretapped: $S_A + S_A'$ (see FIG. 7)). The common-key generating unit 15 generates, for example, an encryption key r including an amount of information for n−k−t, n−k−2t, n−k−3t, ... bits (step S6). The communication apparatus on the transmission side uses the encryption key r as a common key to be shared with the communication apparatus on the reception side.

As described above, according to the present embodiment, an error of reception data is corrected using check matrixes for the "Irregular-LDPC code", which are definite and have stable characteristics, and a part of shared information is discarded according to error correction information laid open to the public. Consequently, parities are not exchanged the enormous number of times to specify and correct an error bit. Error correction control is performed by simply transmitting error correction information. Thus, it is possible to substantially reduce time required for error correction processing. Since a part of shared information is discarded according to information laid open to the public, it is possible to generate a common key security of which is highly guaranteed.

According to the present embodiment, a desired parity check matrix is extracted from the parity check matrix $H_{R(1)}$ while a coding ratio is lowered until an error of reception data is completely corrected, an additional syndrome is further generated, and error correction processing is repeatedly executed using the additional syndrome. Since this makes it unnecessary to discard shared information generated to estimate a noise level of a communication path, it is possible to substantially improve efficiency of generating a common key.

INDUSTRIAL APPLICABILITY

As described above, the quantum key distribution method and the communication apparatus according to the present invention are useful as a technology for generating a common key, security of which is highly guaranteed. In particular, the quantum key distribution method and the communication apparatus are suitable for communication on a transmission path on which a wiretapper is likely to be present.

The invention claimed is:

1. A quantum key distributing method of correcting an error of reception data with probability information obtained as a result of measurement of a photon on a quantum communication path to estimate original transmission data and using a result of the estimation as shared information, the quantum key distributing method comprising:

first error-correction-information notifying including
a transmission-side communication apparatus notifying a reception-side communication apparatus of said first error correction information generated based on a second parity check matrix and the transmission data, via a public communication path, the second parity check matrix, which is identical in both of the communication apparatuses, corresponding to a specific coding rate within a desired range, and being extracted from a first parity check matrix that is identical in both of the communication apparatuses, and is optimized at a coding rate in the desired range;

first error correcting including
the reception-side communication apparatus correcting an error of the reception data based on the first error correction information;

second error-correction-information notifying including
the transmission-side communication apparatus notifying the reception-side communication apparatus of additional second error correction information generated based on a third parity check matrix and the transmission data, via the public communication path, the third parity check matrix, which is identical in both of the communication apparatuses, corresponding to a coding rate lower than a last coding rate, and being extracted, when the error of the reception data is not completely corrected, from the first parity check matrix such that last error correction information becomes a part of information at a time of next error correction;

second error correcting including
the reception-side communication apparatus correcting the error of the reception data based on the first error correction information and the second error correction information; and encryption-key generating including, when the error of the reception data is completely corrected at the first error correcting or when the error is completely corrected by repeatedly executing the second check-matrix generating, the second error-correction-information notifying, and the second error correcting,
discarding a part of shared information according to an amount of opened error correction information; and
setting a result of the discarding as an encryption key.

2. The quantum key distributing method according to claim 1, wherein
the first parity-check-matrix generating includes
determining a code length and a coding rate in the desired range;
fundamental-matrix generating including
selecting a matrix forming a basis of the first parity check matrix satisfying conditions that weights of rows and columns are fixed and number of cycles on a bipartite graph is equal to or larger than six; and
generating a first fundamental-matrix corresponding to an upper limit value in the desired range and a second fundamental-matrix corresponding to a lower limit value in the desired range, based on the selected matrix;
check-matrix generating including
optimizing an order allocation of a weight of a row and a weight of a column of a parity check matrix corresponding to the upper limit value by executing Gaussian approximation based on upper limit values of the code length and the coding rate; and
generating a parity check matrix corresponding to the upper limit value of the coding rate by dividing at least one of a row weight and a column weight of the first fundamental-matrix based on the optimized order allocation, and
additional-matrix generating including
optimizing an order allocation of a weight of a row and a weight of a column of a parity check matrix corresponding to the lower limit value under a constraint that a parity check matrix corresponding to the upper limit value is included, by executing the Gaussian approximation based on the lower limit value of the coding rate; and
generating an additional matrix with respect to the parity check matrix corresponding to the upper limit value by dividing at least one of a row weight and a column weight of the second fundamental-matrix based on the optimized order allocation, and
a parity check matrix corresponding to the lower limit value in which the parity check matrix corresponding to the upper limit value and the additional matrix are connected is set as the first parity check matrix.

3. The quantum key distributing method according to claim 2, wherein a Euclidian geometric code is used as a matrix satisfying the conditions that the weights of rows and columns are fixed and the number of cycles on the bipartite graph is equal to or larger than six.

4. The quantum key distributing method according to claim 1, wherein
the first check-matrix generating includes
determining a code length and a coding rate in the desired range;
fundamental-matrix generating including
selecting a matrix forming a basis of the first parity check matrix satisfying conditions that weights of rows and columns are fixed and number of cycles on a bipartite graph is equal to or larger than six; and
generating a fundamental-matrix corresponding to an upper limit value in the desired range and fundamental-matrixes, which includes a fundamental-matrix corresponding to a lower limit value in the desired range, corresponding to a plurality of coding rates set stepwise in the range, based on the selected matrix;
check-matrix generating including
optimizing an order allocation of a weight of a row and a weight of a column of a parity check matrix corresponding to the upper limit value by executing Gaussian approximation based on upper limit values of the code length and the coding rate; and
generating a parity check matrix corresponding to the upper limit value of the coding rate by dividing at least one of a row weight and a column weight of the first fundamental-matrix based on the optimized order allocation; and
additional-matrix generating including
optimizing an order allocation of a weight of a row and a weight of a column of a parity check matrix corresponding to the coding rate under a constraint that a parity check matrix corresponding to the coding rate at one stage higher is included, by executing the Gaussian approximation based on a coding rate at one stage lower than a last coding rate; and
generating an additional matrix with respect to a parity check matrix corresponding to a coding rate at one stage higher by dividing at least one of a row weight and a column weight of a fundamental-matrix corresponding to a coding rate at one stage lower based on the optimized order allocation,
the additional-matrix generating is repeatedly executed until the coding rate reaches a coding rate corresponding to the lower limit value while decreasing the coding rate, and
a parity check matrix corresponding to the lower limit value in which the parity check matrix corresponding to the upper limit value and all additional matrixes are connected is set as the first parity check matrix.

5. The quantum key distributing method according to claim 4, wherein
a Euclidian geometric code is used as a matrix satisfying the conditions that the weights of rows and columns are fixed and the number of cycles on the bipartite graph is equal to or larger than six.

6. A reception-side communication apparatus that corrects an error of reception data with probability information obtained as a result of measurement of a photon on a quantum communication path to estimate original transmission data and using a result of the estimation as shared information to be shared with a transmission-side communication apparatus, the reception-side communication apparatus comprising:
a decoding unit that corrects the error of the reception data based on a second parity check matrix and error correction information received from the transmission-side communication apparatus via a public communication path, the second parity check matrix, which is identical in both of the communication apparatuses, corresponding to a specific coding rate within a desired range, and being extracted from a first parity check matrix that is optimized at a coding rate in the desired range; and
an encryption-key generating unit that discards a part of the shared information according to an amount of opened error correction information and sets a result of discarding as an encryption key, when the error of the reception data is completely corrected, wherein
the decoding unit corrects the error of the reception data based on a third parity check matrix and error correction information added from the transmission-side communication apparatus via the public communication path, the third parity check matrix, which is identical in both of the communication apparatuses, corresponding to each coding rate, and being extracted, when the error of the reception data is not completely corrected, from the first parity check matrix such that last error correction information becomes a part of information at a time of next error correction while decreasing the coding rate.

7. The reception-side communication apparatus according to claim 6, further comprising:
a check-matrix generating unit that extracts the second parity check matrix from the first parity check matrix, and extracts the third parity check matrix, when the error of the reception data is not completely corrected, from the first parity check matrix such that the last error correction information becomes the part of information at the time of next error correction while decreasing the coding rate.

8. A transmission-side communication apparatus that uses, when a reception-side communication apparatus estimates original transmission data from reception data with probability information obtained as a result of measurement of a photon on a quantum communication path, a result of the estimation as shared information to be shared with the reception-side communication apparatus, the transmission-side communication apparatus comprising:
an error-correction-information generating unit that generates error correction information based on a second parity check matrix and the transmission data and notifies the reception-side communication apparatus of a result of generating the error correction information via a public communication path, the second parity check matrix corresponding to a specific coding rate within a desired range, and being extracted from a first parity check matrix that is optimized at a coding rate in the desired range; and
an encryption-key generating unit that discards a part of the shared information according to an amount of opened error correction information and sets a result of discarding as an encryption key, when the error of the reception data is completely corrected, wherein
the error-correction-information generating unit notifies the reception-side communication apparatus of additional error correction information via the public communication path until the error of the reception data is completely corrected, based on a third parity check matrix, which is identical in both of the communication apparatuses, corresponding to each coding rate, the third parity check matrix being extracted, when the error of the reception data is not completely corrected, from the first parity check matrix such that last error correction information becomes a part of information at a time of next error correction while decreasing the coding rate.

9. The transmission-side communication apparatus according to claim 8, further comprising:
a check-matrix generating unit that extracts the second parity check matrix from the first parity check matrix, and extracts the third parity check matrix, when the error of the reception data is not completely corrected, from the first parity check matrix such that the last error correction information becomes the part of information at the time of next error correction while decreasing the coding rate.

\* \* \* \* \*